United States Patent [19]

Mohri

[11] 4,247,398

[45] Jan. 27, 1981

[54] HIGH GRADIENT MAGNETIC SEPARATION APPARATUS

[75] Inventor: Kaneo Mohri, Fukuoka, Japan

[73] Assignee: TDK Electronics Co., Ltd., Tokyo, Japan

[21] Appl. No.: 88,937

[22] Filed: Oct. 29, 1979

Related U.S. Application Data

[63] Continuation of Ser. No. 893,680, Apr. 5, 1978, abandoned.

[30] Foreign Application Priority Data

Apr. 5, 1977 [JP] Japan .................................. 52-38692

[51] Int. Cl.[3] .............................................. B01D 35/06

[52] U.S. Cl. .................................................... 210/222

[58] Field of Search .............. 210/222; 75/122, 123 B, 75/170; 148/120

[56] References Cited

U.S. PATENT DOCUMENTS

| | | | |
|---|---|---|---|
| 3,567,026 | 3/1971 | Kolm | 210/222 |
| 3,856,513 | 12/1974 | Chen et al. | 75/122 |
| 4,036,638 | 7/1977 | Ray et al. | 75/123 B |
| 4,038,073 | 7/1977 | O'Handley | 75/170 |
| 4,053,331 | 10/1977 | Graham, Jr. | 148/120 |
| 4,056,411 | 11/1977 | Chen et al. | 75/170 |

*Primary Examiner*—Theodore A. Granger
*Attorney, Agent, or Firm*—Armstrong, Nikaido, Marmelstein & Kubovcik

[57] ABSTRACT

Disclosed herein is a high gradient magnetic separation (HGMS) apparatus, in which ferromagnetic metal wool is used to separate, for example, iron powders from water. Due to the high magnetic gradient around the metal wool, the separation of the iron powders takes place. Because of an improvement of the metal wool used in this HGMS apparatus, iron powders and the like can be collected at a high collecting efficiency, and the renewal operation of the metal wool can be performed in a short period of time. The improvement according to the invention resides in employing an amorphous metal alloy for the metal wool.

6 Claims, 4 Drawing Figures

HIGH GRADIENT MAGNETIC SEPARATION APPARATUS

This is a continuation of application Ser. No. 893,680, filed Apr. 5, 1978, now abandoned.

The present invention relates to a high gradient magnetic separation apparatus for removing, for example, iron particles from waste water from, for example, an industrial plant.

In order to separate, for example, iron components from waste water from a factory, it was conventionally necessary to use a sand filter for the iron particles or a tank for precipitating the iron particles, which particles were preliminarily subjected to oxidation. In the conventional separation by the aid of a sand filter or precipitation tank, both a large space for installing the separation apparatus and the long separation time were unavoidable.

In an attempt to decrease both the installing space of the separation apparatus and the separation time, there was previously proposed a high gradient magnetic separation apparatus, which comprised a vessel, steel wool or stainless wool and a magnet for applying a magnetic field from outside of the vessel to the wool. Ther term "wool" means fine long fibers of steel or stainless steel, put together in a form suitable for a filtering means. The high gradient magnetic separation apparatus enabled the effective removal and collection from a fluid of ferromagnetic particles, such as iron particles, as well as paramagnetic particles, such as $MnO_2$ particles. The high gradient magnetic separation apparatus can be broadly applied in the field of, for example, desulfurizing of liquefied coal, concentration of iron oxides in iron ore, and treatment of industrial and urban, waste water.

The known high gradient magnetic separation apparatuses are, however, disadvantageous in the fact the separating ability of these apparatuses deteriorates during the operation of these apparatuses. Namely, smaller amounts of particles are adsorbed on the surface of the metallic fibers as the operation time increases. This decrease in adsorbtion is attributed to the reduction of the magnetic field gradient in the neighbourhood of the metallic fibers, on which fibers rust is formed because of the low corrosion resistance of the steel or stainless steel fibers against the liquid being treated. The rust particles, which can be peeled off from the surface of the fibers, are incorporated, during the operation of the conventional magnetic separation apparatuses, into a filtered liquid free from the ferromagnetic and paramagnetic particles, with the result that the operation of the magnetic separation apparatuses becomes unsatisfactory. The separating ability is reduced not only by the low corrosion resistance, but also by the low mechanical strength of the conventional metallic fibers, such as iron fibers. Namely, several parts of the metallic fibers are broken down into fragments by the liquid being treated in the conventional high gradient magnetic separation apparatuses and, then, the fragments are incorporated into this liquid. This incorporation of the fragments is a particularly serious problem when treating a highly viscous liquid or oil, such as a lubricating oil. The known high gradient magnetic separation apparatuses also involves a problem when the metallic fibers are renewed by a washing water. That is, since the steel or stainless steel fine fibers used in the known high gradient magnetic separation apparatuses exhibit a high residual flux density, a large amount of washing water is necessary for separating the particles, which are firmly adsorbed on the fine wires, from these fine fibers. As a result, large amount of the washing water must be treated to recover the particles mentioned above from the washing water.

It is, therefore, an object of the present invention to provide a high gradient magnetic separation apparatus, which can separate ferromagnetic and paramagnetic particles from a fluid at higher separating ratio than in the conventional apparatuses.

It is another object of the present invention to prevent fragments or rust of the fine fibers from being incorporated into the filtered liquid.

It is further object of the present invention to reduce the time period and amount of fluid necessary for washing metallic fine fibers, which have adsorbed ferromagnetic and paramagnetic particles.

In accordance with the objects of the present invention, there is provided high gradient magnetic separation apparatus comprising:

a vessel having an inlet or inlets for introducing thereinto a fluid, which contains particles of at least one number selected from the group consisting of ferromagnetic fine particles and paramagnetic fine particles, and also having an outlet or outlets for the fluid essentially free from said particles of at least one member;

a ferromagnetic filter means for both admitting passage of the fluid therethrough and separating said particles of at least one memeber from the fluid, said means being positioned within the vessel;

a magnetizing means for applying a magnetic field to the filter means positioned outside of the vessel;

a switching means for deenergizing the magnetizing means;

a supplying means of the fluid into the vessel, and;

a supplying means of a washing fluid for washing said filter means after it has adsorbed thereon said particles of at least one member; wherein a metal which is essentially an amorphous metal alloy is employed for the filter means.

An amorphous substance is generally characterized by the fact that its structure is noncrystalline. To distinguish an amorphous substance from a crystalline substance X-ray diffraction measurement is generally employed. In this regard, an amorphous metal alloy produces a diffraction profile referred to as a halo pattern which varies slowly with the diffraction angle, but does not have sharp diffraction peaks which are reflected from the lattice planes of crystals. It is therefore, possible to determine the amorphous degree of any substance by calculating the ratio of the observed height of peaks with respect to the theoretical height of the known standard peaks of crystals.

The alloy compositions employed within the scope of this invention include any metals which can be produced in the amorphous form, particularly those compositions represented by the general formula:

$$M_xN_y$$

wherein M is at least one metallic element selected from the group consisting of iron, nickel and cobalt, and N is at least one metalloid element selected from the group consisting of phosphorous, boron, carbon and silicon, and wherein the percentage represented by atomic percentages in X and Y are defined by the relationships:

$X+Y=100$, and;

$5 \leq Y \leq 35$.

When the atomic percent X of the metallic component M is lower than 65, or higher than 95, it is impossible to obtain an amorphous metal alloy. When the percentage value X ranges from 65 to 95, the corrosion resistance of the filter means is superior to that of the conventional steel or stainless steel wool.

When the metallic component M mentioned above is nickel, i.e., nickel is selected as the only metallic element, the percentage value X should be 75 atomic % or lower, because the alloy composition $M_xN_y$, mentioned above, is amorphous but not ferromagnetic.

An advantageous alloy composition employed in the scope of the present invention is represented by the general formula:

$M_xN_yT_z$ wherein M is at least one metallic element selected from the group consisting of iron, nickel and cobalt, N is at least one metalloid element selected from the group consisting of phosphorous, boron, carbon and silicon, and T is at least one additional metallic element selected from the group consisting of molybdenum, chromiun, tungsten, tantalum, niobium, vanadium, copper, manganese, zinc, antimony, tin, gemanium, indium, zirconium and aluminum, and percentages represented by atomic percent X, Y and Z are defined by the relationships:

$5 \leq Y \leq 35$;

$0 < Z \leq 15$, and;

$X+Y+Z=100$.

When at least one additional element T is selected from the group consisting of Mo, Cr, W, Ta, Nb, V, Cu, Mn, Zn, Sb, Sn, Ge, In, Zr and Al, and is included in the amorphous alloy of the fine fibers in an amount of 15 atomic % or less, the amorphous metal alloy possesses a superior corrosion resistance to that of the amorphous alloy having the general formula $M_xN_y$, mentioned above. The amount of the additional element T, should preferably be from 0.1 atomic % to 5 atomic %. When the additional element T is selected from the group consisting of molybdenum, chromium and tungsten, the corrosion resistance of the amorphous alloy is excellent.

It is preferable when the molar fraction of every one of the metallic elements, i.e. Fe, Co and Ni, based on the total moles of these elements, is set either in the area surrounded by the lines connecting the points denoted as Fe, Co, $P_1$ and $P_2$ of FIG. 1 attached hereto or on these lines. It is more preferable when the molar fraction mentioned above is set either in the area surrounded by the lines connecting the points Fe, $P_3$ and $P_4$ in FIG. 1 or on these lines.

It is also preferable when the percentage value Y of the metalloids elements is from 5 to 20 atomic %.

The present invention is described herein in detail with reference to FIGS. 2 through 4, attached hereto, wherein.

Figure 2:
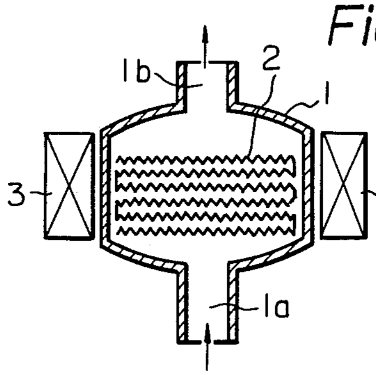
FIG. 2 is a schematic, cross sectional view of the main part of the high gradient magnetic separation apparatus.
Figure 1:
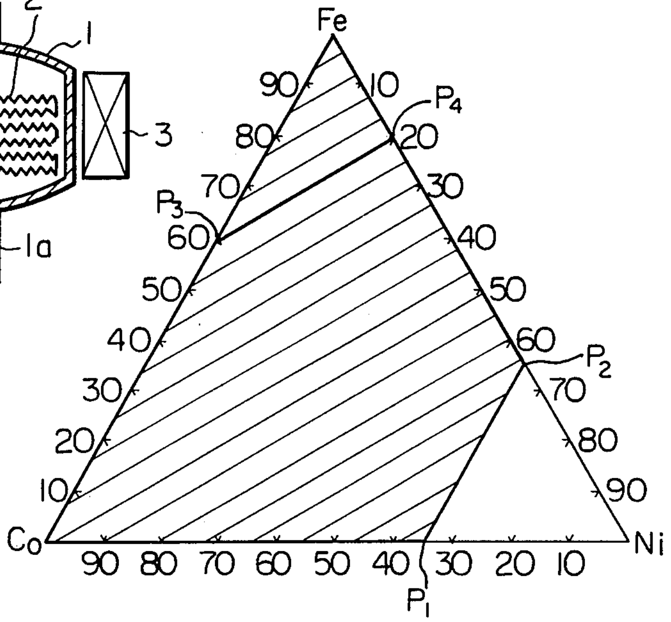

Referring to FIG. 2, the main part of the high gradient magnetic separation apparatus, which may be hereinafter referred to as the HGMS apparatus, consists of the vessel 1, the filter 2 and the magnetizing coils or electromagnets 3. The vessel 1 possesses an inlet 1*a* for admitting the liquid to be treated thereinto. Such liquids as oil, for example a lubricating oil, and a water, for example waste water from industrial plants including a steel rolling plant and a steel pickling plant, are treated in this vessel 1, when it is required to remove or collect the ferromagnetic or paramagnetic powders from these liquids. The filter 2, consisting of fine fibers of an amorphous alloy, is packed in the vessel 1. The filter 2 is provided in the form of metal wool and is packed at such a packing degree as to enable effective filtering of the liquids mentioned above. When the packing density of the metal wool is too high, it is difficult for the liquids to pass through the metal wool. On the other hand, when the packing density is too low, only a small amount of the particles such as the iron particles, can be adsorbed by the filter 2. The fine fibers of the amorphous metal wool should have a diameter ranging from 10 to 200 microns. In order to magnetize the ferromagnetic, amorphous alloy fibers, a pair of the electromagnet coils 3 applies a magnetic field to the filter means 2 in the form of the metal wool during the magnetic separation process. An intense direct magnetic field of, for example, 2 to 4 KG is required to magnetically saturate the amorphous alloy fibers. Due to the high magnetic gradient in the neighbourhood of the fine fibers, the ferromagnetic or paramagnetic particles in the liquid are adsorbed on the surface of the fine fibers, and then, the purified liquid moves out of the vessel 1 through an outlet 1*b*.

Figure 3:
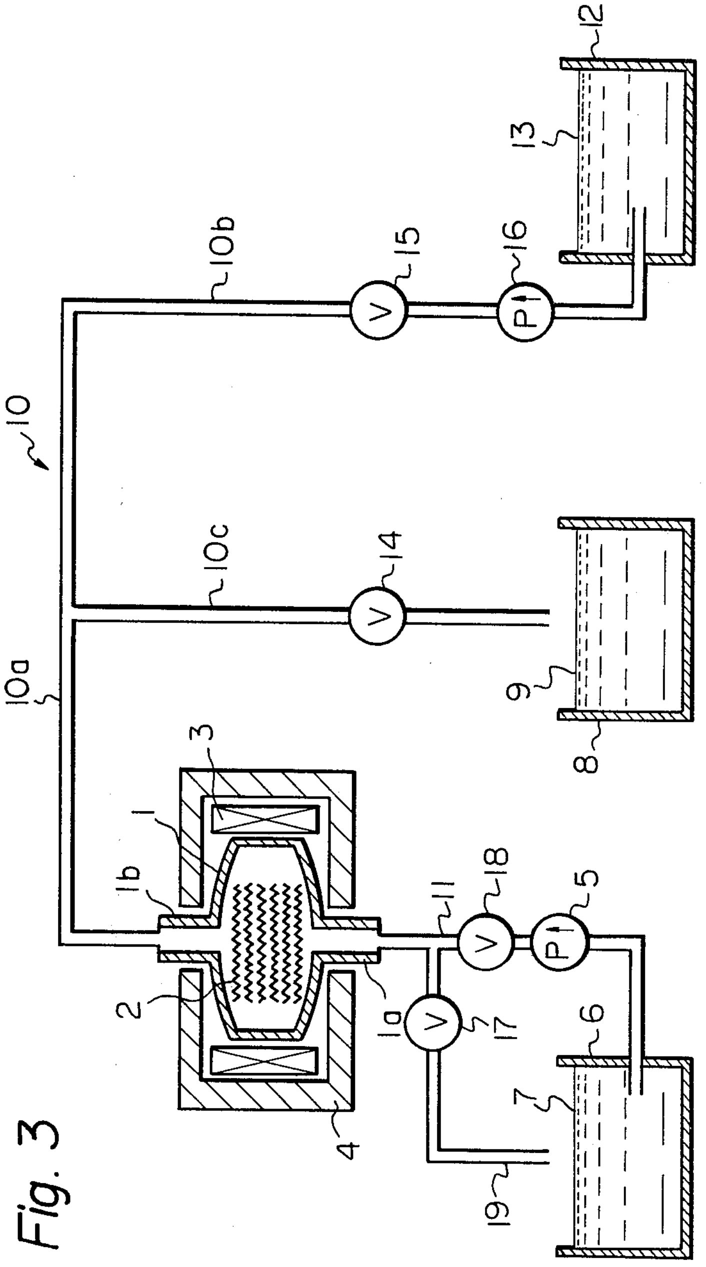
FIG. 3 is a schematic view with liquid flow lines illustrated according to an embodiment of the present invention.

Referring to FIG. 3, the HGMS apparatus comprises the separation vessel 1 enclosed by an iron box 4. The separation vessel 1 is connected via a conduit 11 to a tank 6 for a liquid 7, such as a waste water from a steel pickling plant. A pump 5 supplies the liquid 7 through the conduit via a valve 18 into the separation vessel 1. The water purified in the separation vessel 1 is led through a conduit 10*a* and conduit 10c provided with a valve 14 into a tank 8. The purified water, denoted as 9, can be used again for pickling of the steel articles or renewing the filter 2.

A washing liquid 13, which is usually the same as the liquid 7, is contained in a tank 12 and supplied by a pump 16 through a conduit 10*b* into the separation vessel 1. Before the washing of the vessel 1 by the liquid 13 is started, a not shown switching means deenergizes the coils or electromagnets 3, a valve 15 is opened and the valve 14 is closed. In addition, the valve 18 of the conduit 11 is closed and a valve 17 of a conduit 19, which is branched off from the conduit 11, is opened. The particles adsorbed on the surface of the fine fibers are then washed by the washing water 13 and returned to the tank 6. It is, however, possible to provide a separate tank for collecting the washed particles.

The fine fibers of the amorphous alloy can be produced by various processes already proposed for the super rapid-cooling of an alloy melt at a rate of approximately $10^{6}$° C. per second.

For the purpose of comparing the filter made of the amorphous alloy with that of the crystalline alloy, the same filter as mentioned above was produced from soft steel fibers having a diameter of 0.1 mm.

The magnetic properties of the $Fe_8Co_{72}P_{14}B_6$ alloy and the soft steel were as shown in Table 1.

TABLE 1

| Material | Hc (Oe) | Br (G) | Bs (G) |
|---|---|---|---|
| $Fe_8Co_{72}P_{14}B_6$ (amorphous) | 0.1 | 4,000 | 10,000 |
| Soft Steel (crystalline) | 1.8 | 10,000 | 22,000 |

The present invention is illustrated more in detail by way of the following Examples.

EXAMPLE 1

Fine fibers of an amorphous alloy were produced by the procedure proposed by H. S. Chen and C. E. Miller in the magazine, the title of which is abbreviated as Rev. Sci. Instrum 41 (1970), page 1237. An alloy melt was injected by an argon stream of high pressure into a space between a pair of metallic rollers, which were rotated at 6000 rpm. By predetermining the diameter of a nozzle for injecting the alloy melt, the diameter of the fine fibers was controlled so that it was 0.1 mm.

After proving the halo pattern of the amorphous alloy fibers, the filter was produced from these fibers in the form of wool. The amorphous alloy produced had a composition of $Fe_8Co_{72}P_{14}B_6$. The high gradient magnetic separationn was performed under the following conditions.

(1) Packing Density: 0.5% (percentage of the cross section of the wool fibers relative to the cross section of the separation vessel 1 in FIG. 2).

(2) Length of Filter: 4 cm.

(3) Treated Liquid: water containing 100 ppm of the magnetite particles.

(4) Flow Speed of the Liquid: 6 cm/second.

(5) Applied Magnetic Field: 3.8 KG.

Figure 4:
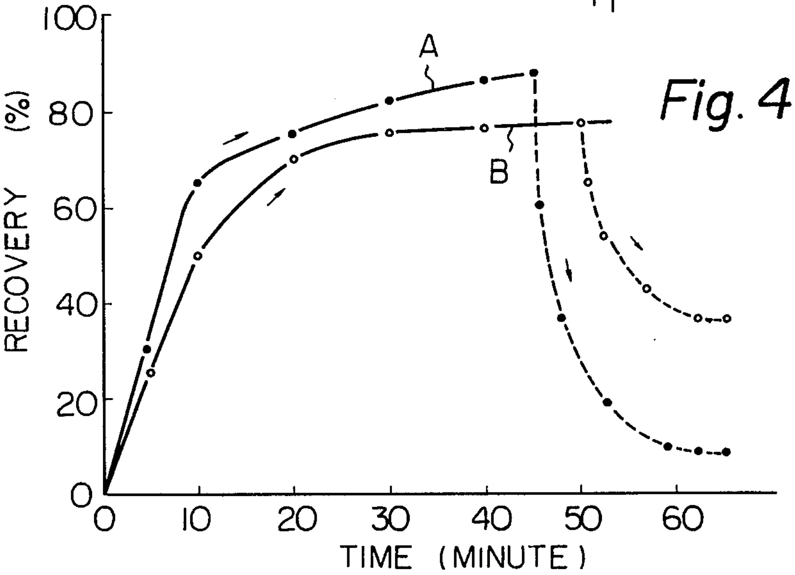
FIG. 4 is a graph representing the recovery change of the iron particles depending upon the operation time of the tested apparatus.

The ratio of collecting the magnetite powders to the magnetite content in the water was measured and the results are shown in FIG. 4, in which the solid lines A and B indicate the collecting ratio of the amorphous filter and the crystalline, soft steel filter, respectively. The collecting ratio mentioned above is indicated in FIG. 4 as Recovery and can be considered a value representing the separating efficiency of the HGMS apparatuses. It is clear from FIG. 4 that the collecting ratio is higher in the present invention (A) than in the known soft steel filter (B).

In the case of using the HGMS apparatus with the soft steel filter, at the initial, liquid-flowing period, broken fragments of the soft steel fine fibers were observed to be present in the liquid which had been treated in the HGMS apparatus. It was also observed that, after the exposure of the already used filter to air for a short period of time, rust was easily formed on the surface of the fine fibers of soft steel.

In the case of using the HGMS apparatus with the amorphous alloy filter, neither the breakdown of nor rust formation of the fine fibers occurred.

After the separation of the magnetite, mentioned above, the renewal of the filters was initiated by flowing a washing water in the opposite direction to the flowing direction of the treated liquid, mentioned above. The results of the renewal operation are shown in FIG. 4 as the dotted lines A and B. When these curves are reduced to a level as low as possible in a short period of time, the renewal efficiency of the filters is better. The renewal efficiency of the HGMS according to the present invention (A) is, therefore, higher than the renewal efficiency of the apparatus using the soft steel fine fibers.

EXAMPLE 2

The procedure of Example 1 was repeated, except for the following conditions of the HGMS operation.

(1) Material of Fine Fibers
Amorphous alloy (invention): $Fe_{80}P_{14}B_6$
Crystalline alloy (control): stainless steel in addition to soft steel (2) Treated Liquid: waste lubricating oil containing 4470 ppm of iron particles When the lubricating oil mentioned above was treated by the HGMS apparatus using fine fibers of the $Fe_{80}P_{14}B_6$ alloy shaped in the form of wool, the content of the iron particles was reduced to 42 ppm. Neither rust formation on the fine fibers nor incorporation of the fibers fragments into the liquid already treated were observed. On the other hand, considerable amount of fragments of steel and stainless steel wool were incorporated into the oil treated by the HGMS apparatus.

EXAMPLE 3

The procedure of Example 1 was repeated, except for the following condition of the HGMS operation.

Material of Fine Fibers
Amorphous alloy (invention): $Ni_{40}Fe_{40}P_{14}B_6$
Crystalline alloy (control): stainless steel The operation of the results of the HGMS apparatus using the fine fibers of the $Ni_{40}Fe_{40}P_{14}B_6$ alloy are shown in Table 2.

TABLE 2

| Time (minute) | 20 | 30 | 40 |
|---|---|---|---|
| Recovery (%) | 75 | 82 | 86 |

The collecting ratio of the particles in the liquid to be treated is indicated as Recovery in Table 2, above, and was superior to the collecting ratio of the HGMS apparatus using the stainless steel wool. Neither rust formation on nor incorporation of fragments from the amorphous fine fibers into the liquid were observed at all.

EXAMPLE 4

The procedure of Example 1 was repeated, except for the following condition of the HGMS operation.

Material of Fine Fibers
Amorphous alloy (invention): $Co_8Fe_{62}Mo_5Si_{15}B_{10}$
Crystalline alloy (control): stainless steel The results of the operation of the HGMS apparatus using the fine fibers of the $Co_8Fe_{62}Mo_5Si_{15}B_{10}$ alloy are shown in Table 3.

TABLE 3

| Time (minute) | 20 | 30 | 40 | 50 |
|---|---|---|---|---|
| Recovery (%) | 70 | 77 | 81 | 84 |

The collecting ratio of the particles in the liquid to be treated is indicated in Table 3, above, and was superior to that of the HMGS apparatus using the stainless steel wool. Neither rust formation on nor the incorporation of the fragments from the amorphous fine fibers into the liquid were observed at all, even after the HGMS operation was repeated for a long period of time.

What I claim is:

1. In a high gradient magnetic separation apparatus comprising:

a vessel having an inlet for introducing thereinto a fluid, which contains particles of at least one member selected from the group consisting of ferromagnetic fine particles and paramagnetic fine particles, and also having an outlet for the fluid essentially free from said particles of at least one member;

a means for filtering ferromagnetic and paramagnetic particles, said means providing for passage of said fluid therethrough and separating said particles of at least one member from said fluid, said means being positioned within said vessel;

a magnetizing means for applying a magnetic field to said filter means, positioned outside of said vessel;

a switching means for de-energizing said magnetizing means;

a means for supplying said fluid into said vessel;

a means for supplying a washing fluid for washing said filter means after it has adsorbed said particles of at least one member; and an improvement which comprises employing as said filter means a metal which is essentially an amorphous metal alloy of the general formula:

$$M_XN_Y$$

wherein M is iron, and N is at least one metalloid element selected from the group consisting of phosphorous, boron, carbon and silicon, and wherein the percentages represented by atomic percentages in X and Y are defined by the relationships:

$$X+Y=100; \text{ and}$$

$$5 \leq Y \leq 35.$$

2. A high gradient magnetic separation apparatus according to claim 1, wherein said percentage value Y is from 5 to 20 atomic %.

3. A high gradient magnetic separation apparatus according to claim 1, wherein said ferromagnetic filter means is an amorphous metal alloy of the general formula:

$$M_XN_YT_Z$$

wherein M is iron, N is at least one metalloid element selected from the group consisting of phosphorous, boron, carbon and silicon, and T is at least one additional metallic element selected from the group consisting of molybdenum, chromium, tungsten, tantalum, niobium, vanadium, copper, manganese, zinc, antimony, tin, germanium, indium, zirconium and aluminum, and percentages represented by atomic percent X, Y and Z are defined by the relationships:

$$5 \leq Y \leq 35;$$

$$0 < Z < 15, \text{ and};$$

$$X+Y+Z=100.$$

4. A high gradient magnetic separation apparatus according to claim 3, wherein said percentage values of Y and Z are from 5 to 20 atomic % and from 0.1 to 5 atomic %, respectively.

5. A high gradient magnetic separation apparatus according to claim 4, wherein said at least one additional element is selected from the group consisting of molybdenum, chromium and tungsten.

6. A high gradient magnetic separation apparatus according to claim 1, wherein said percentage value Y is from 5 to 20 atomic %.

* * * * *